Jan. 2, 1951        C. R. BRADFORD        2,536,345
PROCESS FOR REDUCING FISH OR FISH OFFAL
Filed May 7, 1948        2 Sheets-Sheet 1

Inventor
CHARLES RAYMOND BRADFORD
By Lyon & Lyon
Attorneys

Jan. 2, 1951 C. R. BRADFORD 2,536,345
PROCESS FOR REDUCING FISH OR FISH OFFAL
Filed May 7, 1948 2 Sheets-Sheet 2
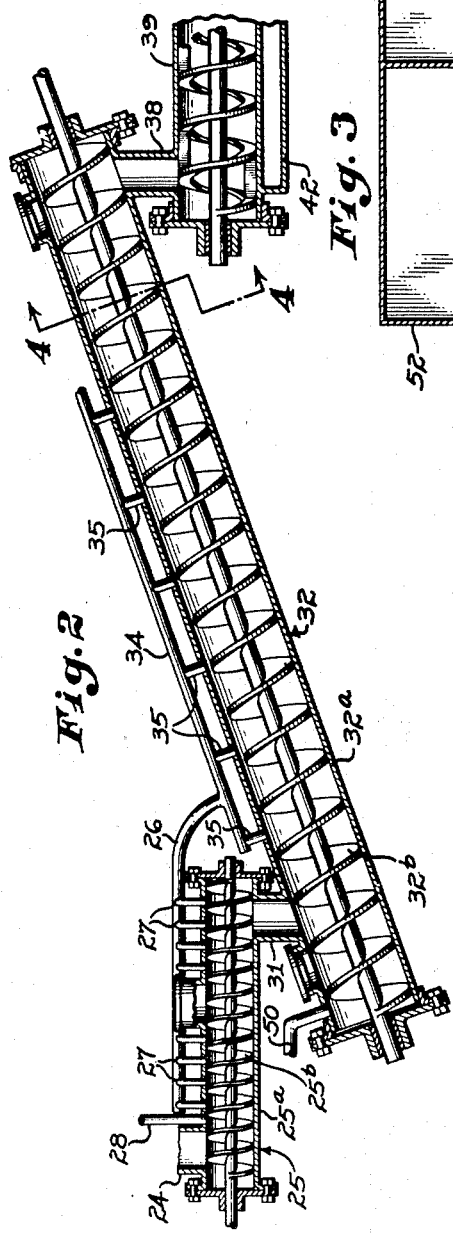
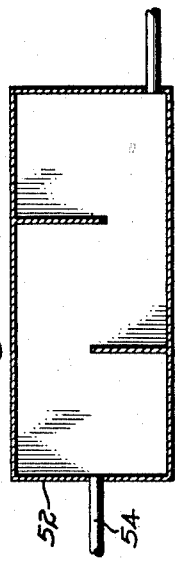
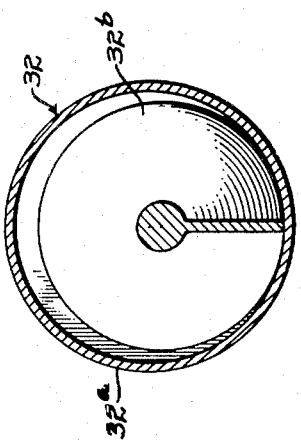
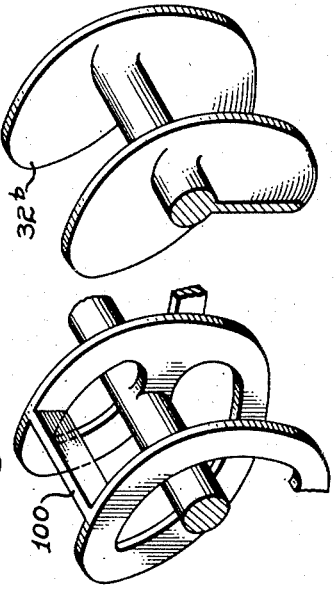
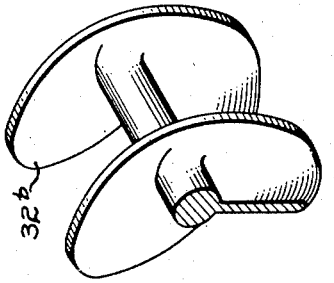
Inventor
CHARLES RAYMOND BRADFORD
By Lyon & Lyon
Attorneys Patented Jan. 2, 1951

2,536,345

UNITED STATES PATENT OFFICE 2,536,345

PROCESS FOR REDUCING FISH OR FISH OFFAL

Charles Raymond Bradford, Los Angeles, Calif.

Application May 7, 1948, Serial No. 25,716

12 Claims. (Cl. 99—2)

This invention relates to the reduction of fish or fish offal into a high protein content fish meal and a fish oil and more particularly to a continuous process for so reducing fish or fish offal characterized by the maintenance of a critical ratio of water to oil-free and water-free solids. Such critical ratio has been discovered to permit continuous solvent extraction of the oil from the cooked fish or fish offal while retaining in the meal a very high percentage of the protein content of the fish.

In the process of this invention the fish or fish offal is first cooked in continuously fed screw-type conveyor cookers to a point where the water content is reduced to the critical range of from 40 to 50 percent by weight, the balance comprising solids and fish oil. It has been discovered that this critical concentration permits the solvent sprayed into the fish in the extractor to extract the oil while meanwhile coagulating the protein content of the fish or fish offal without causing the fish meal to become finely divided and pass into suspension.

The invention contemplates the use of a so-called "heavy solvent," preferred examples being heavy chlorinated hydrocarbons, such as trichlorethylene, and perchlorethylene.

In accordance with the discovery of this invention it has been found that the critical water concentration in the cooked fish meat undergoing extraction is as above stated and that if insufficient moisture has been removed, the fish or fish offal will form an agglomerated mass or many such masses in the extractor, which masses would adhere tenaciously to the screw shaft and walls of the extractor. This would result in a tendency to plug the extractor with the agglomerated masses of fish and halt the operation. Further, this would prevent adequate washing of the meat with solvent and adequate oil extraction. This, of course, would result in lowered amounts of recovered oil and an undesirably high oil content in the final fish meal. Further, if too much moisture has been removed in the cookers so that the percentage of water content falls below the critical value, the fish or fish offal would settle in the solvent in the extractor and thus be carried out of the extractor in the overflow pipes for the oil-rich solvent. This would, of course, contaminate the oil, causing problems in the pipe still and stripping still and result in lowered yields of fish meal.

If, however, the moisture content is maintained at the critical value, the fish or fish offal will neither be agglomerated nor settle in the solvent but will float therein. In floating to the surface of the solvent and in subsequent upward passage through the extractor, the fish or fish offal will be thoroughly washed by the sprays of fresh solvent, thus extracting the oil into the solvent and washing all of the oil-rich solvent from the fish or fish offal. However, the protein content of the fish or fish offal is not dissolved in the solvent, but is coagulated and remains to constitute a substantial part of the solvent-washed fish or fish offal. Further, the fish or fish offal on leaving the extractor would contain a sorbed solvent having a completely negligible oil content. Thus, the maintenance of the critical values results in a maximum recovery of fish oil and a separate maximum recovery of substantially oil-free, high protein-content fish meal, and a continuous operation of the process is not hampered by an excessive amount of fish or fish offal carried over with the oil from the extractor. Likewise, when the moisture content is maintained at the critical value the particles of solids tend to cling to each other in small masses in the presence of the solvent so that the consistency of the mass is such as to make positive conveyance upwards through a screw conveyor possible, and as the fish or fish offal passes upwards through the screw conveyor in the extractor it can be thoroughly washed by the solvent.

The process further contemplates the drying of the fish meal after it leaves the extractor for the recovery of the sorbed solvent. The water content of the fish meal still remaining substantially unchanged in passage through the extractor provides what in effect amounts to a steam stripping of the fish meal in the dryers, thus facilitating recovery of the solvent, and, if desired, additional steam may be applied in a steam stripper. The solvent may be recovered in condensers and recirculated. The oil-rich solvent upon leaving the extractor is subjected to distillation and steam stripping to separate the solvent and to purify the oil. The solvent recovered in this series of operations is also recirculated to the extractor.

The process of this invention also contemplates that all vapors and gases are completely confined, and all uncondensed vapors or gases may be scrubbed prior to venting to the atmosphere to remove all objectionable odors, thus eliminating the usual odors surrounding a fish reduction plant.

It is therefore one object of this invention to provide a continuous fish reduction process and apparatus resulting in a high recovery of fish oil and a separate high recovery of substantially oil-free, high protein-content fish meal.

It is a further object of this invention to provide such a continuous reduction of fish in which a critical concentration of water in the fish undergoing solvent extraction is maintained.

It is a further object of this invention to maintain in a continuous fish reduction plant a critical concentration of water in the fish undergoing solvent extraction which concentration is reduced sufficiently to prevent the formation of agglomerated masses of fish likely to plug the apparatus and likely to prevent adequate washing of the fish with the solvent.

It is a further object of this invention to maintain in a continuous fish reduction plant a critical concentration of water in the fish undergoing extraction which concentration is sufficient to prevent settling of the fish meat in the solvent which would result in the fish passing out of the extractor in the pipes provided for the oil-rich solvent.

It is a further object of this invention to maintain in a continuous fish reduction plant a critical concentration of water in the fish or fish offal undergoing extraction such that the particles of fish meat cling to each other in the presence of the solvent with a consistency such as to make possible a positive conveyance of the fish meat upwards through the screw conveyor countercurrent to a continuous wash of fresh solvent.

It is a further object of this invention to use in a continuous fish reduction plant a heavy solvent, such as trichlorethylene which solvent is capable of extracting the oil from the fish or fish offal and coagulating the protein content of the fish undergoing extraction so as to make possible the production of a low oil-content, high protein-content fish meal.

It is a further object of this invention to provide a novel fish reduction apparatus or plant for continuously cooking and extracting the fish, drying the fish meal, and distilling the solvent from fish oil in accordance with the above-described process.

These and further objects and advantages of the present invention will be apparent in the annexed specification, in which:

Figure 2 is an enlarged section through the extractor of this invention.

Figure 3 is a cross section through the surge tank shown in Figure 1.

Figure 4 is an enlarged cross section taken along the line 4—4 of Figure 2.

Figure 5 is an enlarged perspective elevation of a section of the screw conveyor used in the cookers and dryers.

Figure 6 is a similar enlarged perspective elevation of a section of the screw conveyor used in the extractor.

Figure 1:
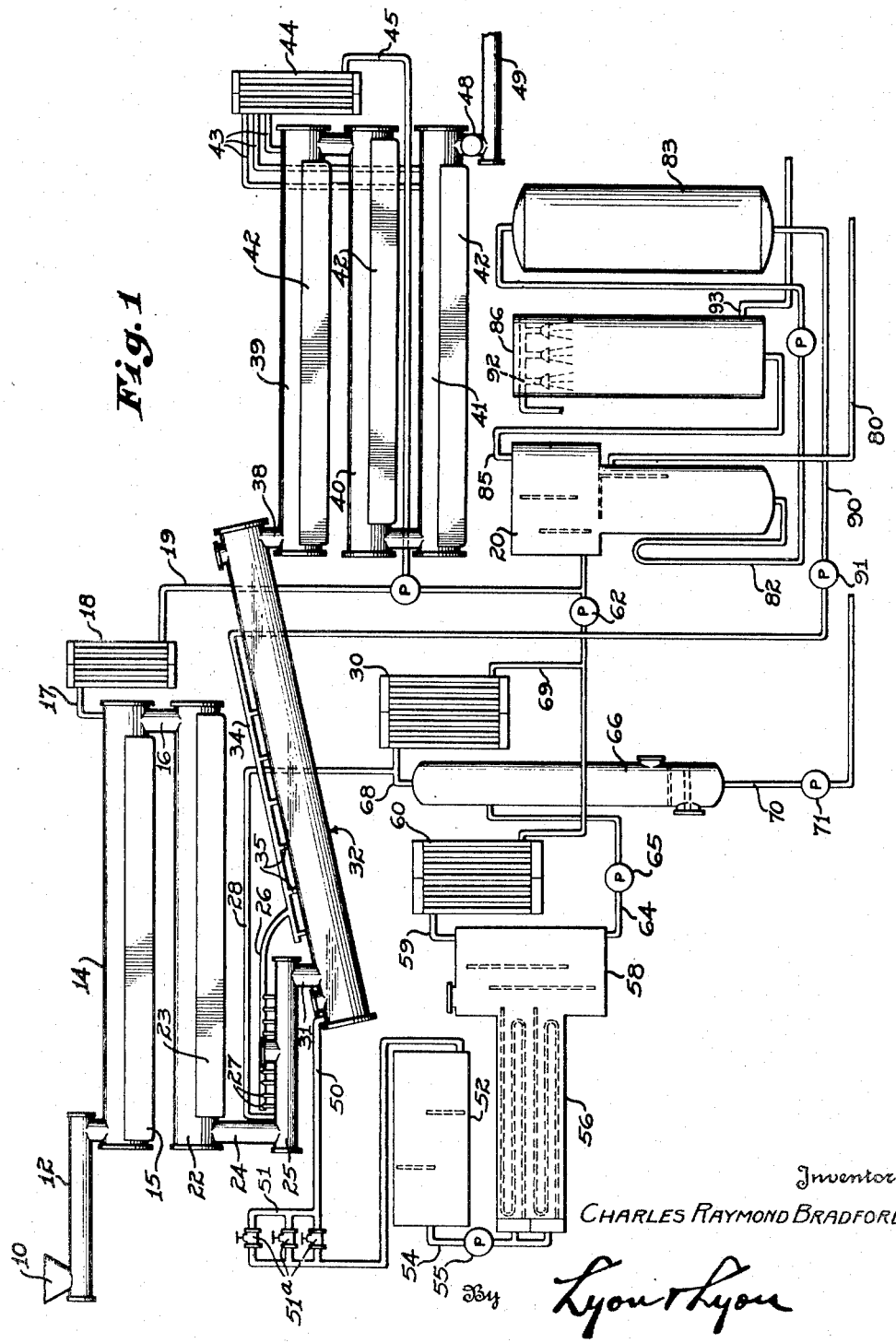
Figure 1 is a diagrammatical view of the apparatus of this invention.

Referring now more particularly to the drawings, there is shown a hopper 10 feeding a feed screw 12 leading to a cooker 14. The cooker 14 is provided with a feed screw (not shown) for advancing the fish under treatment along the cooker and has a steam jacket 15 partially surrounding the cooker as indicated. The return bend 16 leads to a similar cooker 22 similarly provided with a feed screw, in this case feeding the fish in the opposite direction. A similar steam jacket 23 is provided on the cooker 22. A vapor pipe 17 leading to a condenser 18 is provided in communication with the cookers 14 and 22 by means of which vapors and water from the fish are condensed and passed by means of the line 19 to a separator 20.

Fish from the cooker 22 is passed through a pipe 24 to feed screw 25. The feed screw 25 as shown in Figure 2 comprises a tubular member 25a in which is disposed a screw conveyor 25b and a header 26 is provided having a plurality of spray pipes 27 thereon for spraying solvent on the fish meat being passed along the feed screw 25. A vapor line 28 communicates with the feed screw 25 and leads to the condenser 30 and thence to the separator 20. From the feed screw 25 the cooked fish and solvent is passed by pipe 31 to the extractor 32. The extractor 32 comprises a tubular member 32a, preferably pitched at an angle of from 0° to 30° from horizontal, and a screw conveyor 32b is mounted therein with the bottom flights of the screw conveyor in firm, sliding contact with the bottom of the tube 32a and with a free space, in practice approximating one inch, between the top flights of the screw and the internal dimension of the top of the tube 32a as clearly indicated in Figure 2.

In the extractor 32 the fish is fed continuously upward by means of the conveyor 32b and subjected to a countercurrent of solvent sprayed over the fish by means of a header 34 and spray pipes 35. In the drawings six of the spray pipes 35 have been illustrated, but it will be appreciated that any number of pipes may be used to vary the rate of supply of solvent within the purview of this invention.

From the extractor 32 fish solids are passed by a pipe 38 to a series of dryers 39, 40, and 41, respectively. Each of the dryers has a steam jacket 42, and vapor from the dryers 39, 40, and 41 is passed by vapor lines 43 to a condenser 44 thence to the line 45 to the separator 20. From the final dryer 41 extracted and dried fish meal suitable for grinding is fed through a pipe 48 to discharge pipe 49.

Solvent is continuously passed from the extractor 32 by a solvent line 50 to a surge tank 52. The solvent line 50 is provided with a stand pipe 51, forming a header from which a plurality of valves 51a are suspended and spaced in vertical relation. As will be apparent, by suitable selection of the valve 51a to open to pass off the solvent from the extractor, the level of solvent in the extractor 32 may be regulated at will. Rich solvent from the surge tank 52 is fed by line 54 and pump 55 to a still 56 from whence the vapors are passed to a separator 58. From the separator 58 vapors are passed by a line 59 to a condenser 60 and thence through the pump 62 to the separtor 20. Also, from the separator 58 the recovered fish oil is passed by the line 64 and pump 65 to the steam stripper 66. Vapors from the steam stripper 66 are passed by the line 68 to the condenser 30 and thence by the line 69 to the separator 20. Fish oil from the steam stripper 66 is passed by the line 70 and pump 71 to storage.

In the separator 20 condensate from the condenser 18, the condenser 44, the condenser 30, and the condenser 60 in the aggregate, including all gases, water, and solvent extracted, are separated, water being continuously taken through the line 80 and passed to the sewer, solvent being continuously taken from the line 82 and passed to solvent storage tank 83 and non-condensible gases being continuously passed by the line 85 to a scrubber 86 in which the gases flow countercurrent to sprays of water admitted at the top through pipe 82. The water having absorbed the odorous gases is passed to the sewer through pipe 93, the gases vented from the scrubber 86 being completely clean and odorless. A solvent feed line 90 is provided continuously passing solvent from the solvent storage tank 83 by means of the pump 91 to the solvent spray headers 34 and 26.

Each of the members 12, 14, 22, 39, 40, and 41 comprises essentially a pipe in which is located a left- or right-hand continuous screw.

The cookers 14 and 22 and the dryers 39—41 employ the type of ribbon screw shown in Figure 5 in which a tumbling bar 100 is connected between adjacent flights of the screw for scraping the fish from the bottom of the cookers and dryers and stirring and agitating the fish to prevent burning thereof while the screw conveyor of the extractor 32 is a continuous solid screw, as shown in Figure 6, disposed eccentrically of the extractor 32 as indicated in Figure 4.

As stated before, the extractor 32 is inclined from the horizontal, and in practice I have found that angles of inclination from 0° to 32°, depending upon the type of fish, seem to be the limits of inclination, and preferably for most fish, particularly for tuna, an inclination of approximately 20° from the horizontal is desirable.

In carrying out the process fish placed in the hopper 10 is fed by the screw conveyor 12 to the cookers 14 and 22 wherein it is dried to the critical water content of from 40 per cent to 50 per cent. The fish is then fed by the screw conveyor 25 to the extractor 32 being given a preliminary solvent wash in the screw conveyor 25 and being subjected to a countercurrent solvent wash in the solvent extractor 32 as well as a bath of solvent, the level of which is maintained by a selection of a suitable valve 51a on the line 50. Oil-rich solvent is then fed to the surge tank 52 to the still 56 and separator 58. Oil from the separator 58 is purified in the steam stripper 66 and represents one of the final products. Meanwhile, solids from the extractor 32 are fed to the dryers 39, 40, and 41 wherein they are dried, and any entrained solvents and vapors are dissipated. The solids emerging from the pipe 49 are dried fish meal forming one of the products of this invention.

As noted hereinbefore, vapors are taken off wherever generated, condensed in the condensers and passed to the separator 20 wherein the solvent is recovered and fed to the solvent storage tank 83 for recirculation, uncondensed gases and vapors being scrubbed in the scrubber 86 prior to venting to the atmosphere to remove objectionable odors.

It will thus be apparent that by means of this invention a continuous operation of a solvent oil extraction plant has been achieved, and in the process of so continuously extracting the fish oil, I have been able to obtain an increased protein content in the fish meal, an example of the increase obtained being apparent from typical tests in which identical tuna offal was treated by conventional pressing methods, the final protein content of the pressed meal equaling 60.69 per cent, with the final protein content of the meal processed by this invention equaling 73.44 per cent.

While there has been described a particular apparatus for carrying out the process of the present invention, it will be appreciated that this is merely a preferred form of apparatus for facilitating the carrying out of the process of the invention and the process is by no means limited to the particular apparatus illustrated; and while there has been described what is at present considered a preferred form of the apparatus, it will be appreciated by those skilled in the art that various changes and modifications be made therein without departing from the essence of the invention, and it is intended to cover therein all such changes and modifications as come within the true spirit and scope of the appended claims.

What is claimed is:

1. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of organic solvent to dissolve the fish oil from the fish and coagulate the protein in the fish meal; and separately recovering the fish oil from the solvent and drying the separated fish meal.

2. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of chlorinated hydrocarbon solvent to dissolve the fish oil from the fish and coagulate the protein in the fish meal; and separately recovering the fish oil from the solvent and drying the separated fish meal.

3. The method of continuously reducing fish to fish meal and fish oil which comprises the steps of continuously cooking the fish to reduce the water content thereof to a critical range of from 40 per cent to 50 per cent by weight; continuously passing the cooked fish to countercurrent wash of chlorinated hydrocarbon solvent selected from the group comprising trichlorethylene or perchloroethylene to dissolve the fish oil from the fish and coagulate the protein in the fish meal; and separately recovering the fish oil from the solvent and drying the separated fish meal.

4. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of trichlorethylene solvent to dissolve the fish oil from the fish and coagulate the protein in the fish meal; and separately recovering the fish oil from the solvent and drying the separated fish meal.

5. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of perchlorethylene solvent to dissolve the fish oil from the fish and coagulate the protein in the fish meal; and separately recovering the fish oil from the solvent and drying the separated fish meal.

6. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of organic solvent sufficient to saturate said cooked fish with said solvent to dissolve the fish oil from the fish and coagulate the protein in the fish meal; and separately recovering the fish oil from the solvent and drying the separated fish meal.

7. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of organic solvent to dissolve the fish oil from the fish and coagulate the protein in the fish meal; washing the fish with additional solvent to separate out the oil-rich solvent; and separately recovering the fish oil from the solvent and drying the separated fish meal.

8. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of chlorinated hydrocarbon solvent to dissolve the fish oil from the fish and coagulate the protein in the fish meal; washing the fish with additional solvent to separate out the oil-rich solvent; and separately recovering the fish oil from the solvent and drying the separated fish meal.

9. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of trichlorethylene solvent to dissolve the fish oil from the fish and coagulate the protein in the fish meal; washing the fish with additional solvent to separate out the oil-rich solvent; and separately recovering the fish oil from the solvent and drying the separated fish meal.

10. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of perchlorethylene solvent to dissolve the fish oil from the fish and coagulate the protein in the fish meal; washing the fish with additional solvent to separate out the oil-rich solvent; and separately recovering the fish oil from the solvent and drying the separated fish meal.

11. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of organic solvent to dissolve the fish oil from the fish and coagulate the protein in the fish meal; washing the fish with additional solvent to separate out the oil-rich solvent; separately recovering the fish oil from the solvent and drying the separated fish meal; and continuously collecting all solvent bearing vapors from the cooking and drying steps as well as the solvent from the oil separation steps and recovering the solvent for recirculation.

12. The method of continuously reducing fish to fish meal and fish oil which comprises the steps of continuously cooking the fish to reduce the water content thereof to a critical range of from 40 per cent to 50 per cent by weight; continuously passing the cooked fish to a countercurrent wash of organic solvent to dissolve the fish oil from the fish and coagulate the protein in the fish meal; washing the fish with additional solvent to separate out the oil-rich solvent; separately recovering the fish oil from the solvent and drying the separated fish meal; continuously collecting all solvent bearing vapors from the cooking and drying steps as well as the solvent from the oil separation steps and recovering the solvent for recirculation; and scrubbing all uncondensed gases from said solvent recovery steps to deodorize said gases.

CHARLES RAYMOND BRADFORD.

REFERENCES CITED

The following references are of record in the file of this patent:

UNITED STATES PATENTS

| Number | Name | Date |
| --- | --- | --- |
| 1,267,611 | Wells | May 28, 1918 |
| 1,421,283 | Meakin | June 27, 1922 |
| 1,748,356 | Lawrence | Feb. 25, 1930 |
| 2,097,147 | Dinley | Oct. 16, 1937 |
| 2,187,208 | McDonald | Jan. 16, 1940 |
| 2,193,871 | Hanno | Mar. 19, 1940 |
| 2,247,851 | Rosenthal | July 1, 1941 |
| 2,416,196 | Mortenson | Feb. 18, 1947 |